United States Patent
Edwards et al.

(10) Patent No.: US 7,421,494 B2
(45) Date of Patent: Sep. 2, 2008

(54) METHOD AND APPARATUS FOR FACILITATING DATA TRANSFERS BETWEEN ARBITRARY COMPONENTS

(75) Inventors: Warren Keith Edwards, San Francisco, CA (US); Mark Webster Newman, San Francisco, CA (US); Jana Zdislava Sedivy, Palo Alto, CA (US)

(73) Assignee: Xerox Corporation, Norwalk, CT (US)

( * ) Notice: Subject to any disclaimer, the term of this patent is extended or adjusted under 35 U.S.C. 154(b) by 1019 days.

(21) Appl. No.: 10/732,700

(22) Filed: Dec. 9, 2003

(65) Prior Publication Data

US 2004/0122957 A1    Jun. 24, 2004

Related U.S. Application Data

(63) Continuation-in-part of application No. 10/058,268, filed on Jan. 29, 2002.

(51) Int. Cl.
  *G06F 15/173*   (2006.01)
  *G06F 15/16*   (2006.01)
(52) U.S. Cl. ............... 709/224; 709/223; 709/227
(58) Field of Classification Search ........... 709/203, 709/223, 224, 245, 227
See application file for complete search history.

(56) References Cited

U.S. PATENT DOCUMENTS

| 6,421,716 | B1 * | 7/2002 | Eldridge et al. | 709/219 |
| 6,842,460 | B1 * | 1/2005 | Olkkonen et al. | 370/465 |
| 7,088,687 | B2 * | 8/2006 | Ayyagari et al. | 370/278 |
| 7,152,110 | B2 * | 12/2006 | Pierce | 709/227 |

* cited by examiner

*Primary Examiner*—Ario Etienne
*Assistant Examiner*—Hussein Elchanti
(74) *Attorney, Agent, or Firm*—Park, Vaughan & Fleming LLP

(57) ABSTRACT

One embodiment of the present invention provides a system that facilitates transferring data between system components. During operation, the system receives a transfer session object at a data sink component through a universal data transfer interface, wherein the transfer session object contains mobile code that implements a source-specific data transfer protocol for communicating with a data source component. Next, the system retrieves data from the data source component through the transfer session object. In this way, the data sink component can retrieve data from the data source component without having to be preconfigured with the source-specific data transfer protocol for communicating with the data source component.

31 Claims, 4 Drawing Sheets

METHOD AND APPARATUS FOR FACILITATING DATA TRANSFERS BETWEEN ARBITRARY COMPONENTS

RELATED APPLICATION

This application is a continuation-in-part of, and hereby claims priority under 35 U.S.C. § 120 to, U.S. patent application Ser. No. 10/058,268, entitled, "System And Method For Enabling Arbitrary Components To Transfer Data Between Each Other," by inventors Warren Keith Edwards, Mark Webster Newman and Jana Zdislava Sedivy, filed 29 Jan. 2002 (pending).

BACKGROUND

1. Field of the Invention

The present invention relates to techniques for transferring data between components in a system. More specifically, the present invention relates to a method and an apparatus that facilitates transferring data between arbitrary system components without having to preconfigured the components to use a specific data transfer protocol.

2. Related Art

In many system architectures, there is often the need for one component to transfer data to another component. For example, a computer system may need to transfer a file containing a document to a printer, or a file system component may need to move data to a component that operates on files. In another example, a display source component may need to move digital descriptions of a laptop screen to a projector component.

Note that it is impractical to use a single standardized protocol to perform such data transfers because different types of data transfers have different requirements. For example, the requirements for streaming video are vastly different from the requirements for file system transfers. Furthermore, as components continue to develop and change, new requirements and new data transfer protocols frequently arise. Hence, it is impossible for a standardized data transfer protocol to accommodate all possible data transfer requirements for components that are currently being developed or have yet to be developed.

Existing systems solve this problem by maintaining many different types of protocol-specific code or data-type specific code at each component for communicating with other components. For example, referring to FIG. 1, computer system 100 maintains customized code 102 for communicating with different components, including, browser 105, telephone 106, personal digital assistant (PDA) 108, and printer 110. More specifically, computer system 100 can be configured with customized code that understands the HTTP protocol and the HTML data type to communicate with browser 105 on personal computer 104. Computer system 100 can also be configured with customized code that understands the Voice Over IP (VoIP) protocol to communicate with telephone 106. Computer system 100 can additionally be configured with customized code that understands the Bluetooth protocol for communicating with PDA 108, as well as customized code that understands the Internet Printing Protocol and the Postscript data type for communicating with printer 110. Note that although FIG. 1 illustrates data transfers involving devices that are external to computer system 100, data transfers can also take place between components that are internal to computer system 100, for example between an application and a file system.

When a new device is added to computer system 100, a user typically has to install a new driver (or other type of customized code module) that understands a new protocol for communicating with the new device. This driver installation process can be time-consuming and bothersome, especially for inexperienced system users. Some operating systems, such as the Windows™ operating system distributed by the Microsoft corporation of Redmond, Wash., maintain large collections of drivers to communicate with thousands of known devices. This collection of drivers can be extremely useful for communicating with devices that have already been developed. However, the collection cannot contain new drivers that may be required to communicate with new devices. Furthermore, a large amount of time and effort (as well as memory space) is required to maintain thousands of drivers.

Hence, what is needed is a method and an apparatus that enables data to be transferred between arbitrary system components using the specific protocols appropriate to those components, and yet without having to preconfigured the components to use those specific protocols.

SUMMARY

One embodiment of the present invention provides a system that facilitates transferring data between system components. During operation, the system receives a transfer session object at a data sink component through a universal data transfer interface, wherein the transfer session object contains mobile code that implements a source-specific data transfer protocol for communicating with a data source component. Next, the system retrieves data from the data source component through the transfer session object. In this way, the data sink component can retrieve data from the data source component without having to be preconfigured with the source-specific data transfer protocol for communicating with the data source component.

In a variation on this embodiment, prior to the data sink component receiving the transfer session object, the data sink component requests to receive the transfer session object from the data source component through the universal data transfer interface.

In a variation on this embodiment, prior to the data sink component receiving the transfer session object, a client sets up the data transfer between the data source component and the data sink component. The client does this by obtaining a transfer session object from the data source component through the universal data transfer interface, and then communicating the transfer session object to the data sink component through the universal data transfer interface.

In further variation, prior to obtaining the transfer session object from the data source component, the client performs a discovery operation to discover available components in the system. Next, the client inspects the available components to determine which universal interfaces are supported by the available components. The client subsequently selects the data source component and the data sink component from the available components.

In further variation, the client additionally subscribes to receive transfer status information from the transfer session object.

In further variation, prior to obtaining the transfer session object from the data source component, the client provides context information, which describes the client to the data source component. This enables the data source component to perform an access control operation on the client prior to sending the transfer session object to the client.

In a variation on this embodiment, retrieving data through the transfer session object involves negotiating a physical transfer medium and/or a data transfer protocol for transferring the data between the data source component and the data sink component.

In a variation on this embodiment, the transfer session object is leased to the data sink component, wherein at the end of the lease copies of the transfer session object are deactivated. In a further variation, the transfer session object is leased for as long as the data sink component continues to access the transfer session object. In yet a further variation, the transfer session object is leased for as long as the data sink component continues to renew the lease.

In a variation on this embodiment, retrieving data from the data source component involves first communicating data type information to the data source component to facilitate retrieving the data in a specific data type format.

In a variation on this embodiment, the data source component and the data sink component can be local components that reside within the same computer system, or remote components that communicate with each other through a network.

In a variation on this embodiment, the data sink component and the data source component can include: a computing device, a networked consumer electronics device, a hardware component within a computer system, a software module, or a service.

In a variation on this embodiment, the mobile code can include proxy code that communicates with a remote implementation of the transfer session object.

In a variation on this embodiment, the mobile code can include a programmatic interface associated with an object that is a proxy for a remotely implemented networked service.

Table 1 illustrates the structure of a data source interface in accordance with an embodiment of the present invention.

Table 2 illustrates the structure of a data sink interface in accordance with an embodiment of the present invention.

Table 3 illustrates the structure of a transfer session object in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Data Sink Obtains Transfer Session Object From a Data Source Component

Figure 2:
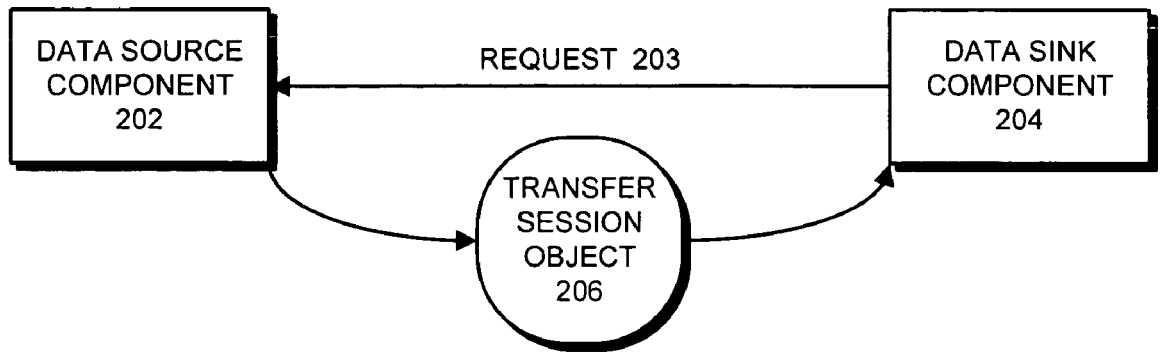
FIG. 2 presents a diagram illustrating how a data sink component receives a transfer session object from a data source component in accordance with an embodiment of the present invention.
Figure 3:
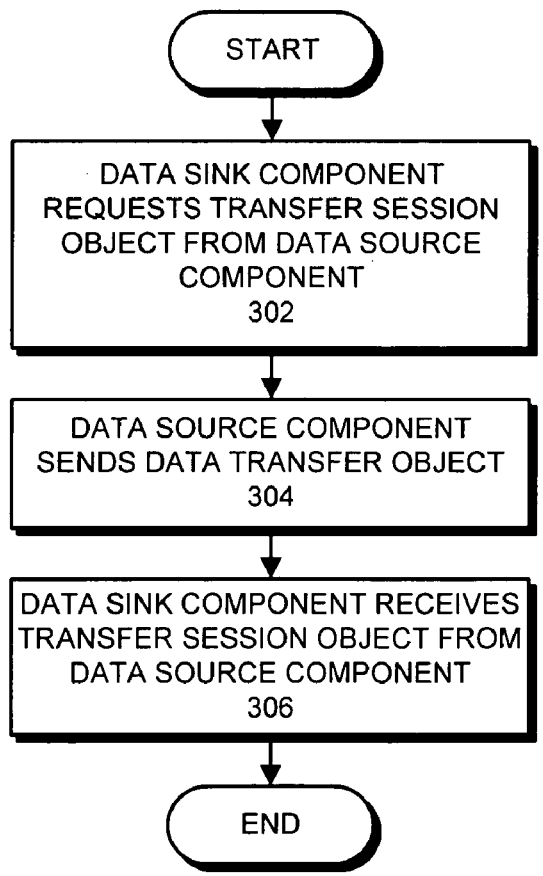
FIG. 3 presents a flow chart illustrating how the data sink component receives the transfer session object from the data source component in accordance with an embodiment of the present invention.

The diagram in FIG. 2 and the flow chart in FIG. 3 illustrate how a data sink component 204 receives a transfer session object 206 from a data source component 202 in accordance with an embodiment of the present invention. Note that data source component 202 and data sink component 204 can include any type of local or remote system component, including, but not limited to, a computing device, a peripheral device, a hardware component within a computer system, a software module, or service that is provided by underlying hardware and software resources.

Each component can support a number of "universal interfaces," which are programmatic interfaces that are known to components throughout the system, and that describe the most basic aspects of services and devices. Note that these universal interfaces do not specify the underlying protocols that are used to communicate with other components to perform the functions that can be performed through the universal interfaces.

For example, one embodiment of the present invention includes: (1) a universal data transfer interface that facilitates data transfers between system components; (2) a universal aggregation interface that facilitates associating system components together into an aggregation (or collection); (3) a universal context interface that facilitates establishing identity, location and other aspects of an entity; (4) a universal notification interface that facilitates asynchronous notifications about components to registered listeners; and (5) a universal control interface that allows components to provide their own user interfaces. The above-described interfaces are presented for purposes of illustration only. In general, many other types of universal interfaces can be supported by the present invention. Also note that components can also implement other non-universal interfaces.

Components can describe their universal interfaces through a network service description, or through some other mechanism, such as a programmatic interface, or a proxy that implements a programmatic interface to communicate with the networked service.

Moreover, entities can obtain access to a component's universal interfaces in a variety of ways. For example, entities can execute a discovery protocol to discover network services that implement the interfaces (using, for example a network service description language such as WSDL). Alternatively, references to services, devices, and software modules that implement the interfaces can be: hard-coded into the component; received in a configuration file; received through a command line; obtained from a directory; passed as a reference from another service; or received through a URL.

Note that in general, entities can access a component's functionality by: interacting with a networked service (e.g. calling WDSL methods over SOAP); calling functions on linked code that implements the programmatic interface (e.g. Java method invocation, C function calls into a DLL); or by calling functions on linked proxy code, which implements the programmatic interface.

Figure 1:
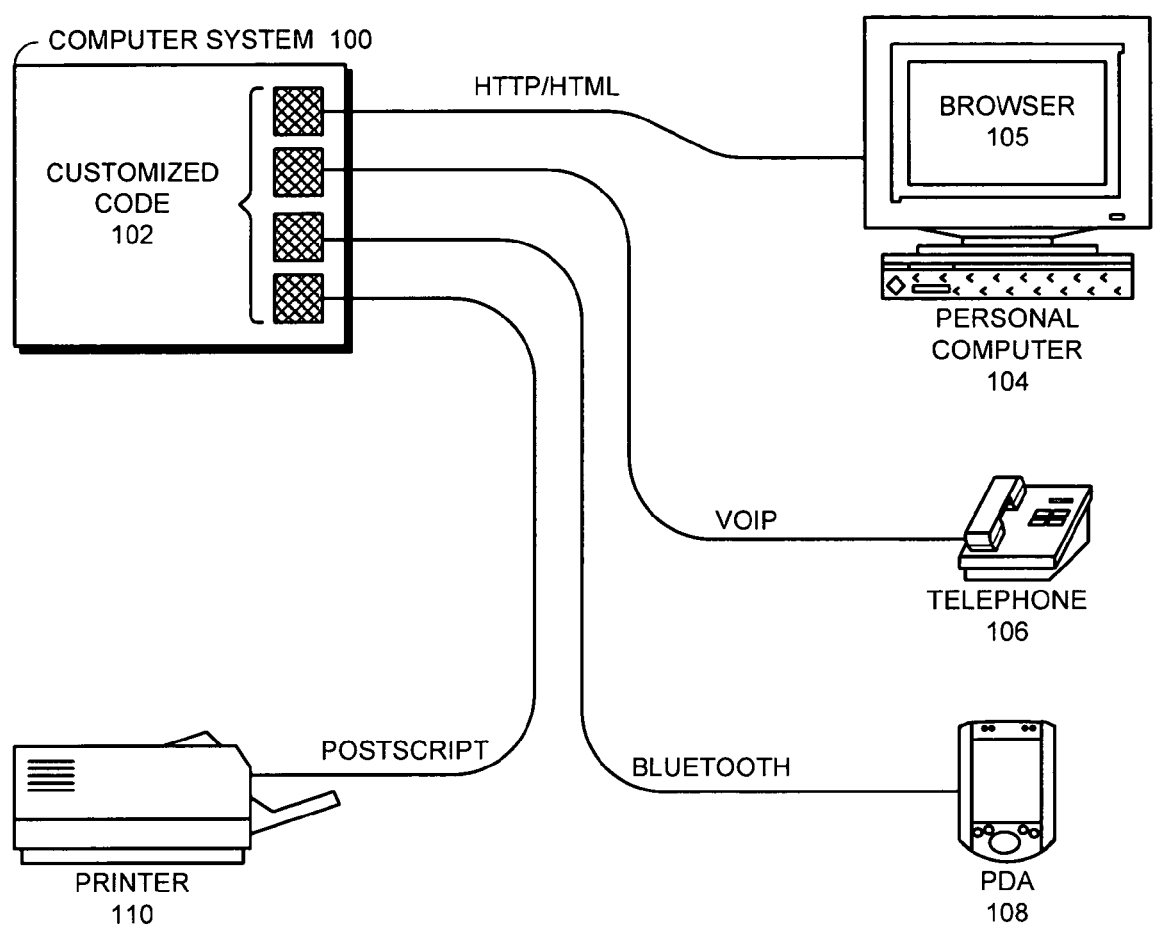
FIG. 1 illustrates a computer system that communicates with different devices using device-specific protocols.

Referring to FIGS. 1 and 2, during operation of the system, a data sink component 204 sends a request 203 to a data source component 202 to receive a transfer session object (step 302). In response to this request, data source component 202 sends the transfer session object 206 (step 304), which is subsequently received by data sink component 204 (step 306). Alternatively, it is possible for transfer session object 206 to be pre-installed or cached at data sink component 204.

Transfer session object 206 is a custom object that contains executable content (for example, mobile code) which is provided by data source component 202 and can be invoked (executed) to provide functionality to data sink component 204. In particular, transfer session object 206 implements a source-specific data transfer protocol for communicating with data source component 202. Note that transfer session object 206 may also contain references to other custom objects.

Mobile code within transfer session object 206 can be implemented in a number of ways. (1) It can include a serialized object (class instance) and a reference to an associated class file, which is transferred from A to B and then executed by B. (2) It can include a class file, possibly along with instantiation parameters, which is transferred from A to B, and is then instantiated and subsequently executed by B. (3) It can include a bundle of class files (such as a Java Archive File) which is transferred from A to B, wherein B instantiates one or more of the class files and executes them. (4) It can include arbitrary non-interpreted code (such as machine code or DLLs), which are transferred from A to B and are then executed by B. (5) It can also include scripts or declarative specifications.

The mobile code in transfer session object 206 can alternatively include references to any of the above implementations. For example, the mobile code can include a reference (or references) to code, objects or classes, which are stored on a third component C, and which are downloaded and executed on B. Alternatively, the mobile code can include a reference to a service provided by a third component C that can be invoked by B.

Client Sets Up Data Transfer

Figure 4:
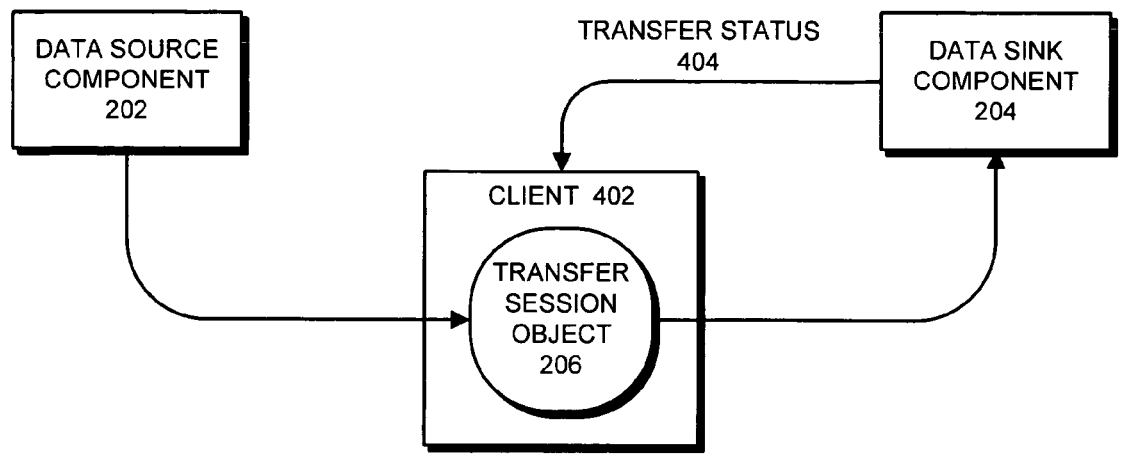
FIG. 4 presents a diagram illustrating how a client sets up a data transfer between a data source component and a data sink component in accordance with an embodiment of the present invention.
Figure 5:
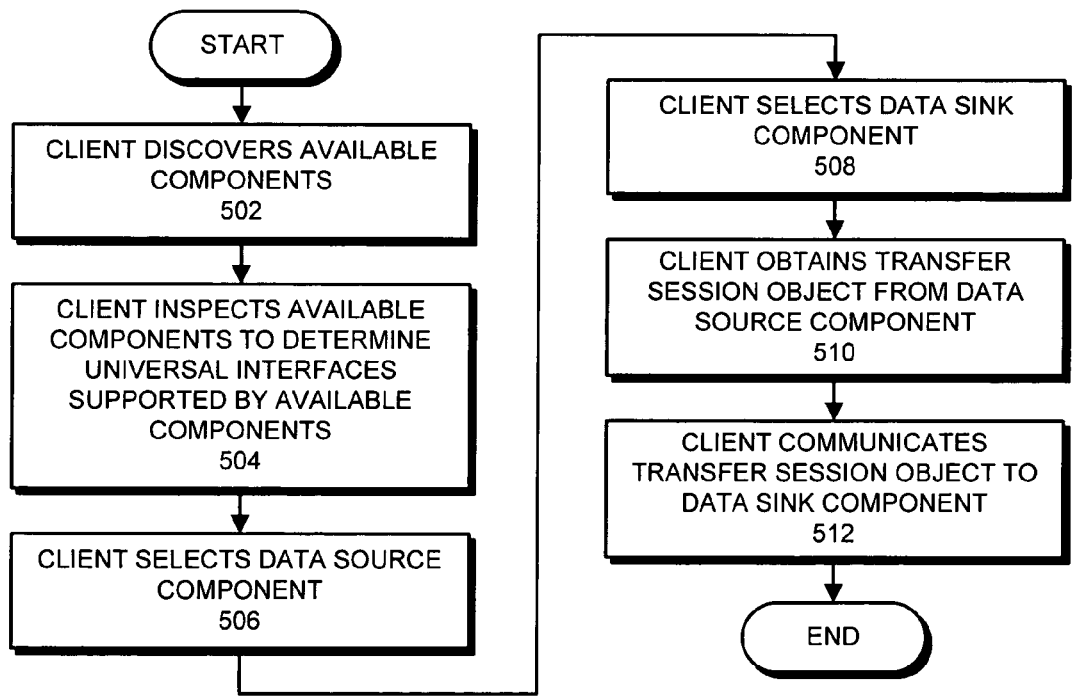
FIG. 5 presents a flow chart illustrating how the client sets up the data transfer between the data source component and the data sink component in accordance with an embodiment of the present invention.

The diagram in FIG. 4 and the flow chart in FIG. 5 illustrate how a client 402 sets up a data transfer between data source component 202 and data sink 204 component in accordance with an embodiment of the present invention. Note that client 402 may or may not be another component.

During system operation, client 402 performs a discovery operation, such as a discovery operation defined by the Bluetooth™ Service Discovery Protocol (SDP), to discover available components in the system (step 502). Next, client 402 inspects the available components to determine which universal interfaces are supported by each available component (step 504). Client 402 then uses this information to select a data source component 202 (step 506) and a data sink component 294 (step 508).

Next, client 402 obtains transfer session object 206 from data source component 202 through the universal data transfer interface (step 510). Client 402 then communicates transfer session object 206 to data sink component 204 through the data transfer interface (step 512). Note that if client 402 registers to be notified of data transfer events, client 402 can subsequently receive transfer status information 404 from any entity that holds a copy of the transfer session object, and that invokes one of the operations, such as abort( ), fail( ) and complete( ) shown in Table 3 below.

Transfer session object 206 is, essentially, an endpoint for communication that now lives within data sink component 204. Since transfer session object 206 originated from data source component 202, it knows the originating endpoint and can (privately) negotiate data transfers with it. Note that a specific data source/transfer session pair can use different protocols for different types of media. For example, a video data source can use compression or progressive encodings. If particular types of data are better suited for particular physical transports, a data source/transfer session pair can also negotiate those details, for example by searching for and using a shared FireWire connection between source and sink machines, if one is available.

In one embodiment of the present invention, client 402 accomplishes steps 510 and 512 by accessing universal "DataSource" and "DataSink" interfaces. These interfaces are described below.

Data Source Interface

An exemplary data source interface appears in Table 1 below.

TABLE 1

```
DataSource {
    DataFlavor[] getSourceDataFlavors( );
    TransferSession beginTransferSession(Context callerContext,
        long initialLeaseDuration)
}
```

Each data source can provide data in a variety of "flavors" (data types). The main part of the interface is begin Transfer Session ( ). Rather than the data source providing data directly, it returns an object called "TransferSession" to a caller. Since this object comes from the source itself, it provides a mechanism by which the source can effectively supply both endpoints of a data transfer. In this way, a source-specific object is downloaded into the caller, code and all, and is used as the receiving endpoint. This allows sources to use completely different transports, protocols, etc., depending on the medium and the content of the transfer:

Also note that transfer sessions can be leased. In this case, a transfer session only remains active for as long as the caller can demonstrate continued proof of interest. If no interest is indicated for a pre-specified amount of time, sources and their users automatically clean up their state, without the need for any ongoing communication.

Also note that, to begin a transfer, the caller can provide the source with information about itself in the form of a "context object." This context object can be used for access control, and the source may log its interactions with various callers for purposes of accountability.

Data Sink Interface

An exemplary data sink interface appears in Table 2 below.

TABLE 2

```
DataSink {
    Void transfer(TransferSession session,
        Context callerContext, DataFlavor pref);
}
```

Sinks are capable of receiving data in various flavors, just as sources can provide it in various flavors; the get Sink Data Flavors( ) method returns the supported flavors for this sink. The most important method for the data sink interface is transfer( ), which instructs a sink to begin reading from a transfer session provided by a source. Again, note that this transfer session comes from the source itself, thereby allowing the source to provide both communication endpoints. A caller that requests a sink to begin a transfer can reveal itself to the sink through a context object that can be used for access control and/or logging.

Note that the above-described arrangement allows any party to initiate a transfer. A sink can self-initiate a transfer, or a third party can acquire references to the other parties and can initiate a transfer. This allows components to act autonomously, as well as at the behest of a third party, such as a browser.

In one embodiment of the present invention, the system implements data sources and sinks that represent software services (such as zombie boards, video projectors, and so on), as well as files (which are typically both sources and sinks). Client software that understands these two interfaces can use either equally well.

Process of Retrieving Data Using Transfer Session Object

Figure 6:
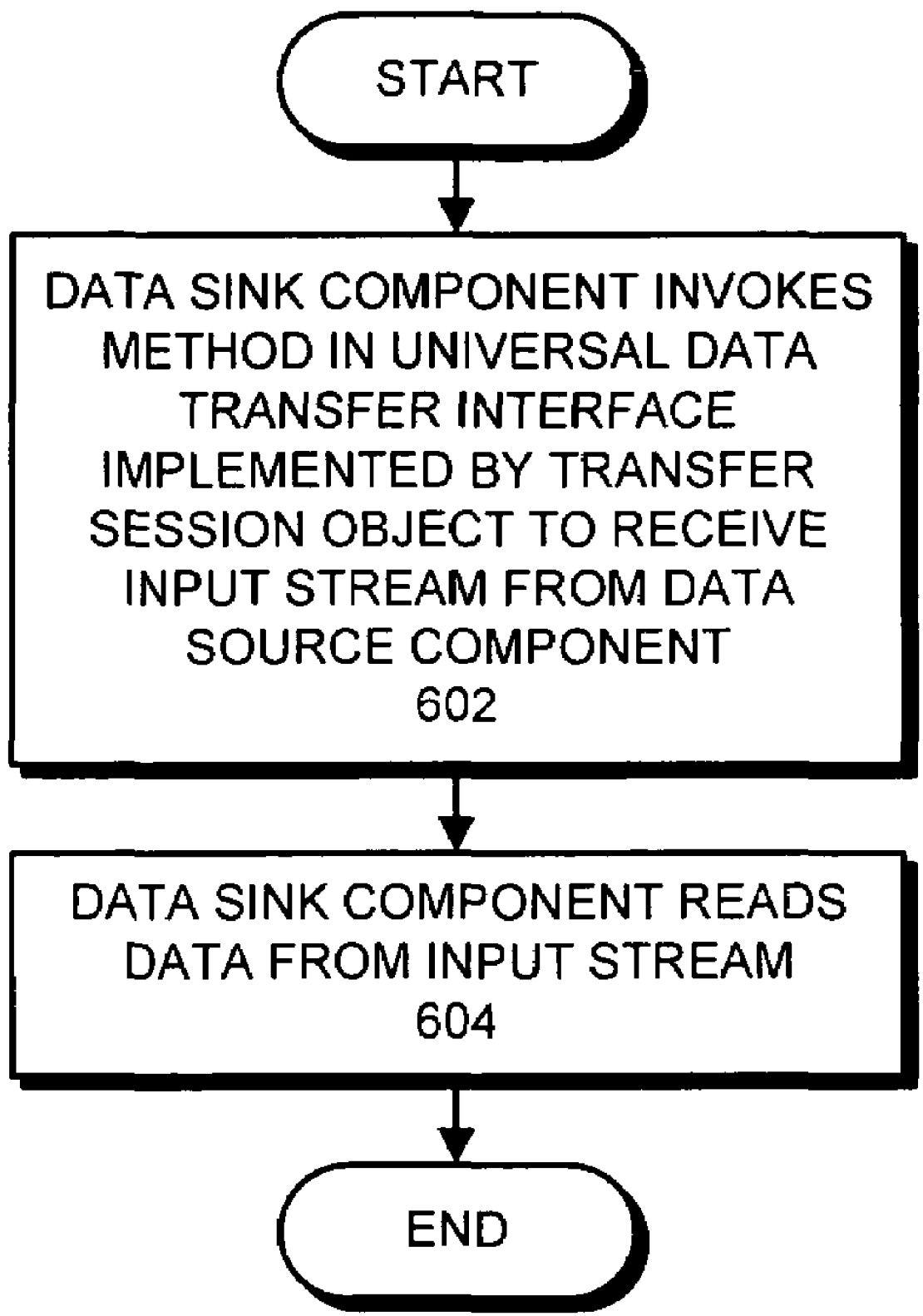
FIG. 6 presents a flow chart illustrating how the data sink component uses the transfer session object to retrieve data from the data source component in accordance with an embodiment of the present invention.

FIG. 6 presents a flow chart illustrating how data sink component 202 uses transfer session object 206 to retrieve data from data source component 202 in accordance with an embodiment of the present invention. To retrieve data from data source component 202, data sink component 202 invokes a data transfer method provided by transfer session object 206 (step 602). This causes data sink component 202 to receive an input stream containing data from data source component 202. Next, data sink component 202 reads the desired data from the input stream (step 604).

In one embodiment of the present invention, transfer session object 206 has the structure that appears below in Table 3.

TABLE 3

```
TransferSession {
    Object getTransferData(DataFlavor requestedFlavor);
    DataSource getDataSource( );
    Lease getLease( );
    Void fail( );
    Void complete( );
    Void abort( );
    EventRegistration
    registerForTransferEvents(RemoteEventListener listener,
        ..., long leaseDuration);
}
```

The most important operation on a Transfer Session is getTransferData(), which returns the actual data from the source. Note that it returns an "Object" type. This allows the system to support one-shot transfers (in which the data is completely returned as some more specific type, such as a String or another Java object), as well as transfers of indeterminate duration, such as receiving streaming video. In this case, the object returned is an Input Stream from which the caller can read.

A signaling protocol allows the caller to indicate when it has completed using the transfer session (since this cannot be determined "automatically" in the case of things like streaming reads). A caller can also indicate failure, completion, or abortion of a transfer using the provided methods. Doing so terminates the viability of the session, and notifies any "listeners" registered with the session.

Listeners are remote event receivers (potentially on different machines) that have registered to be informed of transfer events. For example, a listener might be a browser (so that the browser can inform a user if a transfer fails) or a listener can be any third party entity. The registration of listeners can also be leased, so that a failed listener will be automatically and silently deregistered. This ensures that registrations do not accrete in components.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for transferring data between system components, comprising:

receiving a transfer session object at a data sink component through a universal data transfer interface, wherein the transfer session object contains mobile code which includes executable content with a functionality that implements a source-specific data transfer protocol for communicating with a data source component;

executing the mobile code; and retrieving data from the data source component through the transfer session object, whereby the data sink component can retrieve data from the data source component without having to be preconfigured with the source-specific data transfer protocol for communicating with the data source component;

wherein if the data sink component does not indicate continued proof of interest for a predetermined amount of time, the data source component and the data sink component automatically clean up their state, without the need for any ongoing communication;

wherein prior to obtaining the transfer session object from the data source component, a client:

performs a discovery operation to discover available components in the system;

inspects the available components to determine which universal interfaces are supported by each available component;

selects the data source component from the available components; and selects the data sink component from the available components.

2. The method of claim 1, wherein prior to the data sink component receiving the transfer session object, the data sink component requests to receive the transfer session object from the data source component through the universal data transfer interface.

3. The method of claim 1, wherein prior to the data sink component receiving the transfer session object, the client sets up the data transfer between the data source component and the data sink component, by:

obtaining a transfer session object from the data source component through a universal data transfer interface; and communicating the transfer session object to the data sink component through the universal data transfer interface.

4. The method of claim 3, wherein the client additionally subscribes to receive transfer status information from the transfer session object.

5. The method of claim 3, wherein prior to obtaining the transfer session object from the data source component, the client provides context information, which describes the client to the data source component, thereby enabling the data source component to perform an access control operation on the client prior to sending the transfer session object to the client.

6. The method of claim 1, wherein retrieving data form the data source component through the transfer session object involves negotiating a physical transfer medium and/or a data transfer protocol for transferring the data between the data source component and the data sink component.

7. The method of claim 1, wherein the transfer session object is leased to the data sink component, wherein at the end of the lease copies of the transfer session object are deactivated.

8. The method of claim 7, wherein the transfer session object is leased for as long as the data sink component continues to access the transfer session object.

9. The method of claim 7, wherein the transfer session object is leased for as long as the data sink component continues to renew the lease.

10. The method of claim 1, wherein retrieving data from the data source component involves first communicating data type information to the data source component to facilitate retrieving the data in a specific data type format.

11. The method of claim 1, wherein the data source component and the data sink component can be:
    local components that reside within the same computer system; or
    remote components that communicate with each other through a network.

12. The method of claim 1, wherein the data sink component and the data source component can include:
    a computing device;
    a networked consumer electronics device;
    a hardware component within a computer system;
    a software module; or
    a service.

13. The method of claim 1, wherein the mobile code can include proxy code that communicates with a remote implementation of the transfer session object.

14. The method of claim 1, wherein the mobile code can include a programmatic interface associated with an object that is a proxy for a remotely implemented networked service.

15. A computer-readable storage medium storing instructions that when executed by a computer cause the computer to perform a method for transferring data between system components, the method comprising:
    receiving a transfer session object at a data sink component through a universal data transfer interface, wherein the transfer session object contains mobile code which includes executable content with a functionality that implements a source-specific data transfer protocol for communicating with a data source component;
    executing the mobile code; and
    retrieving data from the data source component through the transfer session object, whereby the data sink component can retrieve data from the data source component without having to be preconfigured with the source-specific data transfer protocol for communicating with the data source component;
    wherein if the data sink component does not indicate continued proof of interest for a predetermined amount of time, the data source component and the data sink component automatically clean up their state, without the need for any ongoing communication.;
    wherein prior to obtaining the transfer session object from the data source component, a client;
    performs a discovery operation to discover available components in the system;
    inspects the available components to determine which universal interfaces are supported by each available component;
    selects the data source component from the available components; and
    selects the data sink component from the available components.

16. The computer-readable storage medium of claim 15, wherein prior to the data sink component receiving the transfer session object, the data sink component requests to receive the transfer session object from the data source component through the universal data transfer interface.

17. The computer-readable storage medium of claim, 15 wherein prior to the data sink component receiving the transfer session object,the client sets up the data transfer between the data source component and the data sink component,by:
    obtaining a transfer session object from the data source component through the universal data transfer interface; and
    communicating the transfer session object to the data sink component through the universal data transfer interface.

18. The computer-readable storage medium of claim 17, wherein the client additionally subscribes to receive transfer status information from the transfer session object.

19. The computer-readable storage medium of claim 17, wherein prior to obtaining the transfer session object from the data source component, the client provides context information, which describes the client to the data source component, thereby enabling the data source component to perform an access control operation on the client prior to sending the transfer session object to the client.

20. The computer-readable storage medium of claim 15, wherein retrieving data from the data source component through the transfer session object involves negotiating a physical transfer medium and/or a data transfer protocol for transferring the data between the data source component and the data sink component.

21. The computer-readable storage medium of claim 15, wherein the transfer session object is leased to the data sink component, wherein at the end of the lease copies of the transfer session object are deactivated.

22. The computer-readable storage medium of claim 21, wherein the transfer session object is leased for as long as the data sink component continues to access the transfer session object.

23. The computer-readable storage medium of claim 21, wherein the transfer session object is leased for as long as the data sink component continues to renew the lease.

24. The computer-readable storage medium of claim 15, wherein retrieving data from the data source component involves first communicating data type information to the data source component to facilitate retrieving the data in a specific data type format.

25. The computer-readable storage medium of claim 15, wherein the data source component and the data sink component can be:
   local components that reside within the same computer system; or
   remote components that communicate with each other through a network.

26. The computer-readable storage medium of claim 15, wherein the data sink component and the data source component can include:
   a computing device;
   a networked consumer electronics device;
   a hardware component within a computer system;
   a software module; or
   a service.

27. The computer-readable storage medium of claim 15, wherein the mobile code can include proxy code that communicates with a remote implementation of the transfer session object.

28. The computer-readable storage medium of claim 15, wherein the mobile code can include a programmatic interface associated with an object that is a proxy for a remotely implemented networked service.

29. An apparatus for transferring data between system components, comprising:
   a data sink component configured to receive a transfer session object through a universal data transfer interface, wherein the transfer session object contains mobile code which includes executable content with a functionality that implements a source-specific data transfer protocol for communicating with a data source component; and
   wherein the data sink component is additionally configured to execute the mobile code to retrieve data from the data source component through the transfer session object, whereby the data sink component can retrieve data from the data source component without having to be preconfigured with the source-specific data transfer protocol for communicating with the data source component; wherein if the data sink component does not indicate continued proof of interest for a predetermined amount of time, the data source component and the data sink component automatically clean up their state, without the need for any ongoing communication; and wherein the apparatus further comprises a client which prior to obtaining the transfer session object from the data source component is configured to:
   perform a discovery operation to discover available components in the system;
   inspect the available components to determine which universal interfaces are supported by each available component;
   selects the data source component from the available components; and
   selects the data sink component from the available components.

30. The apparatus of claim 29, wherein the data sink component is additionally configured to request to receive the transfer session object from the data source component through the universal data transfer interface.

31. The apparatus of claim 29, wherein the client separate from the data source component and the data sink component, and wherein the client is configured to set up the data transfer between the data source component and the data sink component, by:
   obtaining a transfer session object from the data source component through the universal data transfer interface; and
   communicating the transfer session object to the data sink component through the universal data transfer interface.

* * * * *